United States Patent [19]
Kahlbaum, Jr.

[11] 4,206,970
[45] Jun. 10, 1980

[54] CHROMATICALLY CORRECTED VIRTUAL IMAGE VISUAL DISPLAY

[75] Inventor: William M. Kahlbaum, Jr., Hayes, Va.

[73] Assignee: The United States of America as represented by the Administrator of the National Aeronautics and Space Administration, Washington, D.C.

[21] Appl. No.: 953,389

[22] Filed: Oct. 23, 1978

[51] Int. Cl.² .................. G02B 13/16; G02B 9/16
[52] U.S. Cl. ...................... 350/175 E; 350/226
[58] Field of Search ..................... 350/175 E, 226

[56] References Cited
U.S. PATENT DOCUMENTS

| | | | |
|---|---|---|---|
| 2,731,884 | 1/1956 | Brendal | 350/226 |
| 2,900,871 | 8/1959 | Baker | 350/175 E |

*Primary Examiner*—Conrad J. Clark
*Attorney, Agent, or Firm*—Wallace J. Nelson; John R. Manning; Howard J. Osborn

[57] ABSTRACT

An in-line, three element, large diameter, optical display lens having a front convex-convex element, a central convex-concave element, and a rear convex-convex element. The lens, used in flight simulators, magnifies an image presented on a televison monitor and, by causing light rays leaving the lens to be in essentially parallel paths, reduces eye strain of the simulator operator.

3 Claims, 1 Drawing Figure

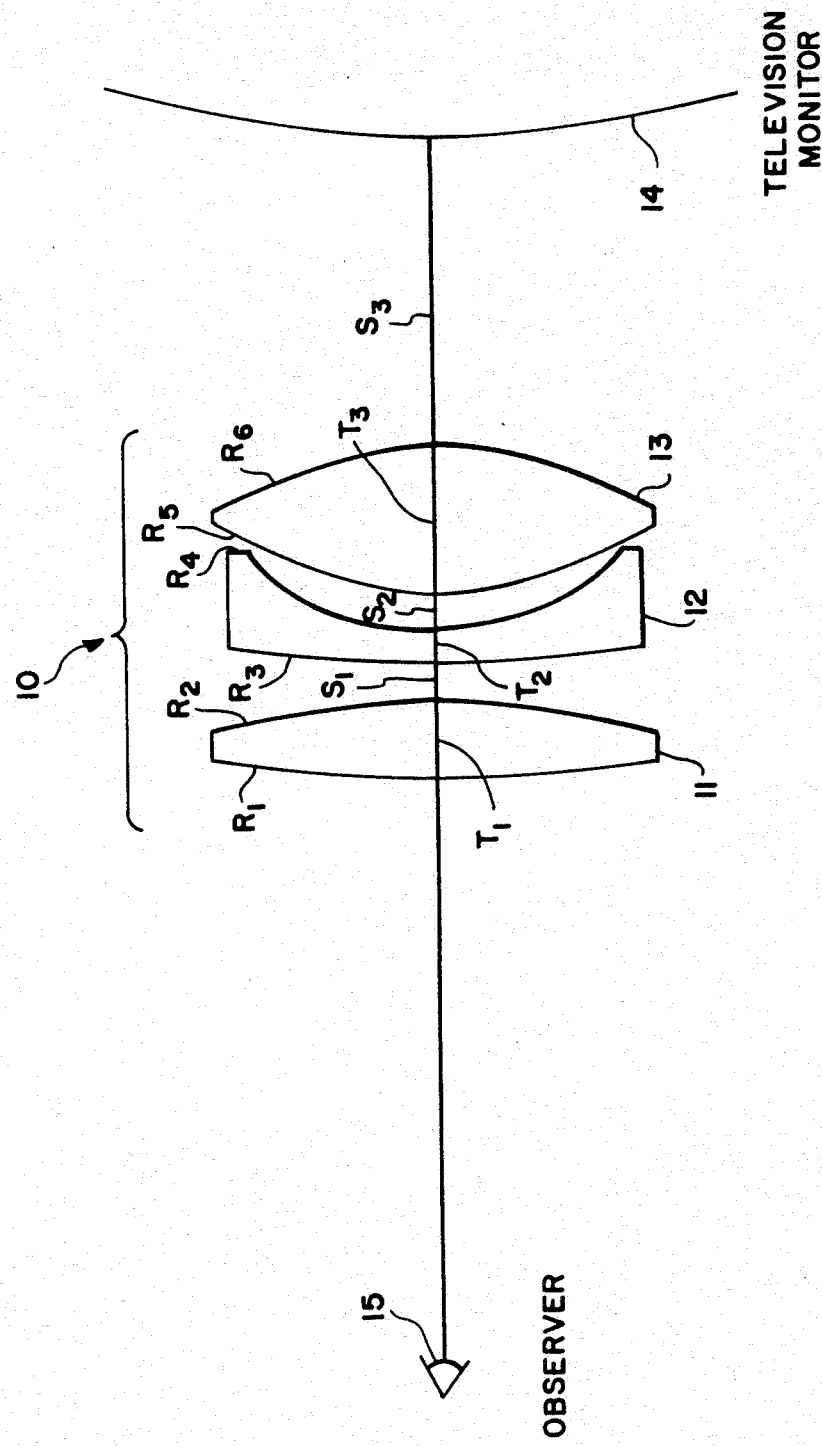

CHROMATICALLY CORRECTED VIRTUAL IMAGE VISUAL DISPLAY

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Modern flight simulators require use of a virtual image viewing system to provide a realistic visual presentation to the pilot operating the flight simulator. Such a system basically consists of a series of lenses or a series of mirrors located between the observer and an image source, such as a closed circuit television monitor. The virtual image system should magnify the image and cause the image to appear to be at a large distance away from the observer, preferably at infinity. Magnification of the image and projecting the image to a large distance causes less eye strain than direct viewing of a television monitor for the same visual field angle.

DESCRIPTION OF THE PRIOR ART

Other methods have been used, with varying amounts of success to provide a visual display for flight simulators. One such system is a non-in-line type of system which consists of a spherical mirror and a beam splitter placed between the television monitor and the observer. Although the non-in-line system has good optical characteristics, it is heavier and larger than other types of systems and generally is more expensive.

Another system consists of two in-line plano convex lenses placed between the observer and the television monitor. A problem with two element systems is the magnitude of the distortion and lateral chromatic aberration. Lateral aberration refers to the formation of color images of different sizes, since magnification depends on color.

It is therefore an object of the present invention to provide an in-line, large diameter, optical display system which is lighter in weight and less expensive than prior art, non-in-line, systems.

An additional object of the present invention is to provide an in-line, optical display system with limited lateral chromatic aberration.

SUMMARY OF THE INVENTION

According to the present invention, the foregoing and other objects are attained by providing an in-line, three element, large diameter optical display lens. The lens is made up of a front convex-convex element, a central convex-concave element, and a rear convex-convex element. In the preferred embodiment the first and third elements are made of acrylic plastic and the second element is made of polystyrene.

BRIEF DESCRIPTION OF THE DRAWING

A more complete appreciation of the invention and many of the attendant advantages thereof will be readily apparent by reference to the following detailed description when considered in connection with the accompanying drawing wherein the single FIGURE is a diagrammatic cross-section of a lens according to the present invention.

DESCRIPTION OF THE PREFERRED EMBODIMENT

Referring now more particularly to the drawing, the illustrated preferred embodiment of the present invention includes a three element, in-line, large diameter, optical display lens designated generally by reference numeral 10. In the description and claims, the term lens describes the complete lens and not the individual elements thereof.

The lens 10, consists of three elements. Element 11 is a convex-convex element. Element 12 is a convex-concave element and element 13 is a convex-convex element. In the preferred embodiment elements 11 and 13 are made of acrylic plastic and the element 12 is made of polystyrene. Use of acrylic and polystyrene elements results in a lens that is both lighter in weight than a similar lens made with glass elements, and less expensive.

An important difference between a virtual image system, as in the present invention, and a photographic system, is that light rays leave lens 10 in almost parallel paths and are focused to a real image by the eye of the observer 15. Whereas a photographic system forms a real image in that the lens causes the light rays to converge to a point located in a plane that contains photographic film. Thus, light rays leaving a point on television monitor 14 diverge until they strike lens 10. Lens 10 bends the light rays so that they follow essentially parallel paths as they leave lens 10. By producing light rays traveling in almost parallel paths, the observer's eyes are focused at infinity and eye strain is reduced.

In the drawings, for each element, $R_i$ indicates the radius of curvature, $T_i$ indicates the axial thickness, $S_i$ indicates the air spacing, and $N_i$ indicates the index of refraction at 5200 Angstroms (Å), subscript "i" being numbered from left to right as shown in the FIGURE. Lens with focal length of 61 cm may be made according to this invention by following the specifications in the preferred embodiments as follows:

| Element | N | Radium (cm) | Thickness or Separation (cm) |
|---|---|---|---|
| 11 | 1.4936 | $R_1 = 112.89$ | $T_1 = 9.445$ |
|  |  | $R_2 = -63.66$ | $S_1 = 4.156$ |
| 12 | 1.5992 | $R_3 = 181.43$ | $T_2 = 3.810$ |
|  |  | $R_4 = 37.03$ | $S_2 = 2.666$ |
| 13 | 1.4936 | $R_5 = 47.04$ | $T_3 = 16.247$ |
|  |  | $R_6 = -58.93$ | $S_3 = 38.60$ | where $S_3$ is the difference between surface $R_6$ to the front surface of the television monitor tube 14.

What is claimed as new and desired to be secured by Letters Patent of the United States is:

1. A three element, in-line, large diameter, optical lens with a focal length of 61 cm, comprising a front convex-convex element, a central convex-concave element, and a rear convex-convex element, said lens being constructed according to the technical description below, wherein $R_1$, $R_2$, $R_3$, $R_4$, $R_5$, and $R_6$ are radii of curvature of the surfaces:

| Element | Radius (cm) |  |
|---|---|---|
| 11 | $R_1 =$ | 112.89 |
|  | $R_2 =$ | −63.66 |
| 12 | $R_3 =$ | 181.43 |
|  | $R_4 =$ | 37.03 |
| 13 | $R_5 =$ | 47.04 |

-continued

| Element | Radius (cm) |
|---|---|
| $R_6 =$ | $-58.93$ |

2. A three element lens as in claim 1 wherein the axial separation, given as $T_i$ for thickness and $S_i$ for air spacing, is as follows:

Axial Separation (cm)

$T_1 = 9.445$ $S_1 = 4.156$ $T_2 = 3.810$ $S_2 = 2.666$ $T_3 = 16.247$ $S_3 = 38.60$ where $S_3$ is the difference between surface $R_6$ to the front surface of the television monitor.

3. A three element lens as in claim 1 wherein the indices of refraction, N, at 5200 Angstroms (Å) are as follows:

| Element | N |
|---|---|
| 11 | 1.4936 |
| 12 | 1.5992 |
| 13 | 1.4936 |

* * * * *